UNITED STATES PATENT OFFICE.

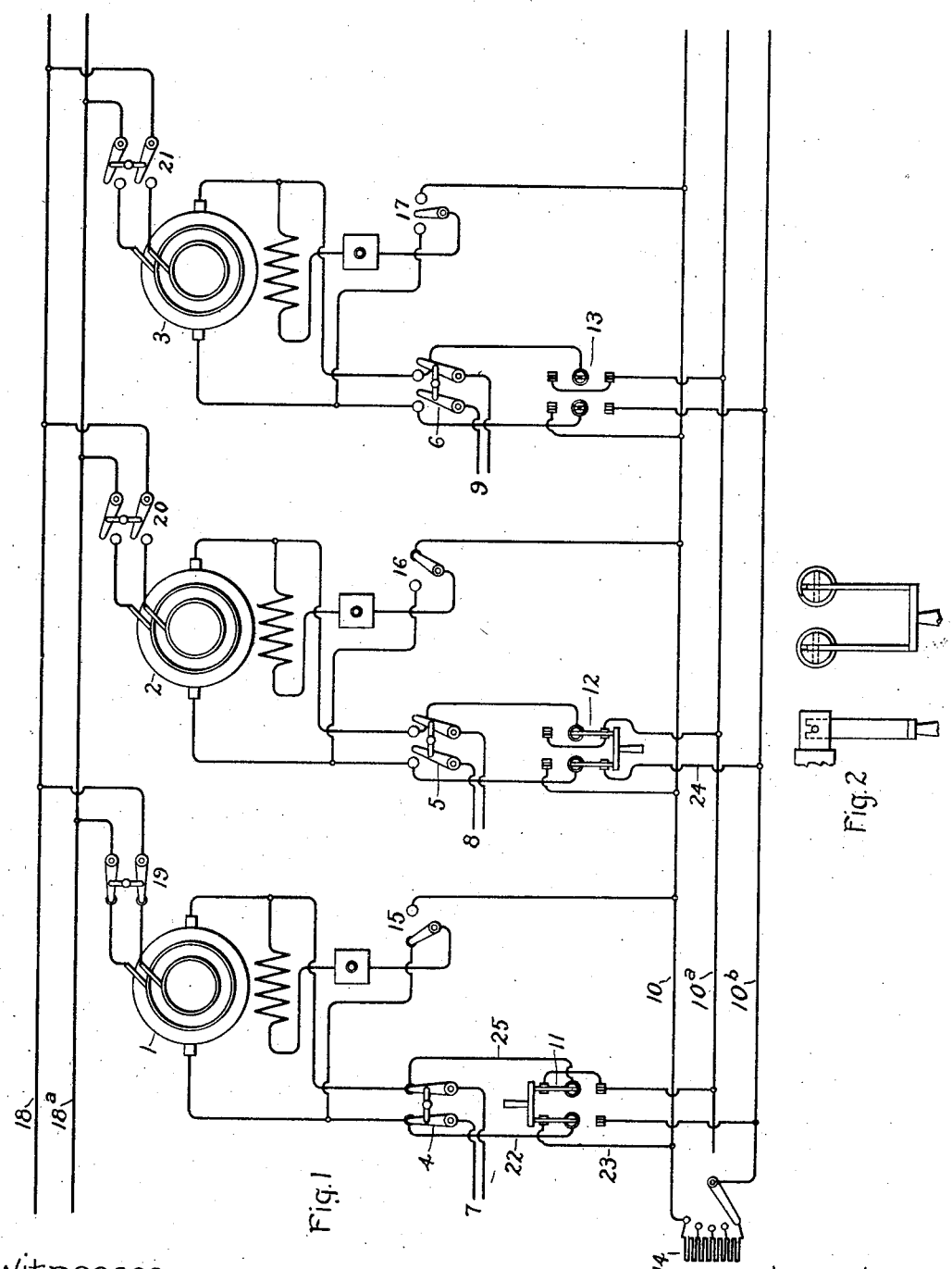

SAMUEL W. MAUGER, OF SCHENECTADY, NEW YORK, ASSIGNOR TO GENERAL ELECTRIC COMPANY, OF NEW YORK.

CONTROLLING ROTARY CONVERTERS.

SPECIFICATION forming part of Letters Patent No. 671,289, dated April 2, 1901.

Application filed January 16, 1901. Serial No. 43,509. (No model.)

*To all whom it may concern:*

Be it known that I, SAMUEL W. MAUGER, a citizen of the United States, residing at Schenectady, county of Schenectady, State of New York, have invented certain new and useful Improvements in Controlling Rotary Converters, (Case No. 1,356,) of which the following is a specification.

This invention relates to the control of rotary converters or motor-generators, the object being to permit any one of a bank or group of such devices at a distributing-station to be started up where there are no common distributing bus-bars for such converters, as in cases where each machine supplies an independent distribution-circuit or impresses a different potential. In such cases it is impracticable to connect the machines up with a set of common distributing bus-bars.

In carrying out the invention I provide a group of auxiliary bus-bars or a common circuit and switches by which any one of the group of machines may be connected through a starting resistance with any other machine of the group, the direct current furnished by any machine therefore thus being available for starting up any other machine of the group. I provide, preferably, a three-wire control-circuit, which may be in the form of three auxiliary bus-bars on the switchboard, across the outside conductors of this circuit placing an adjustable resistance. Each machine is provided with a switch and connections by which potential from the direct-current side may be imposed upon the conductors forming either side of this three-wire circuit. The field-winding of each machine is provided with a switch and connections by which it may be closed in parallel relation to the brushes or may be connected with one side of the three-wire circuit. The switches which connect the brushes of the several machines are removable from their contacts, and I provide, preferably, only two of such switches for the entire system, thereby preventing danger to the machine by oversight on the part of the operator.

The novel features of the invention will be more fully described hereinafter, and specifically indicated in the claims.

In the accompanying drawings, which illustrate my invention, Figure 1 shows diagrammatically a system embodying my improvements, and Fig. 2 represents a movable switch.

1, 2, and 3 represent a group of generators, such as rotary converters or alternating motor-generators, feeding through double-pole switches 4 5 6 into a plurality of independent distribution-circuits 7 8 9. By way of example, each machine is shown feeding into an independent circuit. It will, however, be evident that one or more of the machines may, if desired, connect with common bus-bars feeding a common system.

The distinctive features of my invention are especially applicable to systems in which different potentials are maintained in the several circuits supplied by the different machines—a condition which forbids common bus-bar connections between the machines. I therefore provide an auxiliary set of bus-bars or other equivalent conductors, consisting of a three-wire circuit 10 $10^a$ $10^b$. Each machine may be connected with either side of this circuit by means of a double-pole switch 11 12 13. Across the outside wires of the circuit is a variable resistance 14. Each machine is provided with a two-point field-magnet switch 15 16 17, by which the field-circuit of the converter or generators may be placed in shunt relation to its brushes or may be connected with one pair of the three-wire mains. With such an arrangement any pair of machines may have their armatures connected through the resistance 14 and brought up to speed by cutting out this resistance. With the arrangement of the circuits described damage from possible short circuits might result from carelessness on the part of the operator in leaving several of the control-switches 11, 12, or 13 closed after starting up the machines. In order to avoid this, I provide only two such switches for the entire group of machines, one or both of which is removable from its pivots and may be transferred to any other machine. Preferably both are made removable, as in such case any machine of the system may be used to start up any other machine. As shown in the drawings, the system is one in which an alternating-current source of supply is employed and the direct current is used in the distribution-circuits, 18 18ᵃ representing the alternating-current mains, in which the several machines may be connected by the switches 19 20 21.

In starting up a pair of machines, suppose, for example, machine No. 2 is to be started and that No. 1 has already been started. The movable switch-blade, a detail of which is shown in Fig. 2, may be thrown to the upper clips in switch 11 and the companion switch-blade thrown to the lower clips in switch 12, corresponding to machine No. 2. This connects up the armatures of machines 1 and 2 through the resistance 14 over a circuit from the left brush of machine 1, by way of wire 22, pivot of switch 11, upper contacts of said switch, wire 23, auxiliary bus-bar 10, resistance 14, auxiliary bus-bar 10ᵇ, wire 24, and lower clip of switch 12 to the left brush of machine No. 2, thence back to the armature of machine No. 1 by way of auxiliary bus-bar 10ᵃ, right side of switch 11, conductor 25, to the right brush of machine No. 1. The field-magnet switch 16 should be thrown to the right-hand contact, as indicated in the diagram, thereby charging the field-magnet from the auxiliary bus-bars 10 10ᵃ, with which the armature of machine 1 connects. The machine to be started is then brought up to speed by means of the variable resistance 14, and when synchronized the switch 20, connecting it with the alternating-supply circuit 18 18ᵃ, is thrown and switch 12 opens. The switch 5, connecting the machine with its distribution-circuit 8, may then be thrown and the switch 16 shifted, so as to put the field-circuit in parallel with the armature. Similarly, any machine of the group may be started from any other machine which is operating.

As shown in the drawings, the several machines 1 2 3 derive energy from a single source of alternating current. This, however, is not imperative, as they may be supplied from separate sources. The essential features of novelty relate to the means for starting up several machines which have separate distribution-circuits.

What I claim as new, and desire to secure by Letters Patent of the United States, is—

1. A system of electrical distribution comprising a plurality of motor-generators or rotary converters, independent circuits fed thereby, a common supply-circuit, and starting-switches for interconnecting any pair of machines on their direct-current sides.

2. A system of electrical distribution, comprising a plurality of generators driven by alternating current, independent circuits fed thereby, a starting-circuit common to the several machines, and controlling-switches for connecting any pair of the machines with said common starting-circuit.

3. A system of electrical distribution, comprising a plurality of generators driven by alternating current, independent circuits supplied thereby, an interconnecting circuit for the direct-current sides of the several machines, and a variable starting resistance common to all the machines.

4. A system of distribution, comprising a plurality of generators driven by alternating current, independent circuits supplied thereby, a three-wire interconnecting circuit, switches for connecting the several machines between a pair of wires on either side of said circuit, and a variable resistance between the pair of outside wires.

5. A system of distribution comprising a plurality of generators driven by alternating current, independent circuits supplied thereby, a three-wire interconnecting circuit, switches for connecting the several machines, between either pair of wires, and a field-magnet across one pair of wires.

6. A system of distribution comprising a plurality of generators driven by alternating current, independent circuits supplied thereby, a common starting-circuit for interconnecting the several machines, and a pair of switches for all of the machines, at least one of said switches being removable.

7. A system of distribution comprising a plurality of generators driven by alternating current, independent circuits supplied thereby, a common starting-circuit for interconnecting the several machines, and a pair of switches for all of the machines, both being removable from their pivots.

In witness whereof I have hereunto set my hand this 14th day of January, 1901.

SAMUEL W. MAUGER.

Witnesses:
BENJAMIN B. HULL,
FRED RUSS.